Patented Oct. 19, 1954

2,692,252

UNITED STATES PATENT OFFICE 2,692,252

COMPOSITION AND METHOD OF MAKING SAME

Richard Falck, Atlanta, Ga., assignor to Marianne Falck and Aaron S. Epstein, both of Atlanta, Ga.

No Drawing. Application February 15, 1951,
Serial No. 211,175

8 Claims. (Cl. 260—48)

This invention relates to a complex compound formed by reacting an alkaline earth metal hydroxide, sulfur and a linear thermoplastic phenol-aldehyde polymer (novolak resin).

The complex of the present invention is suitable for use in a fungicidal and insecticidal solution or spray, or dusting powder, for the treatment of plants, plant seedlings, fruits, trees, wood, organic fibers and fabrics made therefrom, and the like. The complex is non-poisonous to humans, animals and plants.

The complex of the present invention may be formed by reacting simultaneously an alkaline earth metal hydroxide such as slaked lime, sulfur such as elemental sulfur and a permanently fusible phenol-aldehyde resin such as an acid-condensed phenol-aldehyde resin of the novolak type in an aqueous vehicle and at an elevated temperature either with or without stirring, suitably in boiling water. The reaction is preferably carried out at atmospheric pressure or at a pressure greater than atmospheric. It may also be carried out under sub-atmospheric pressure.

The proportions of the reactants may be varied as desired. The reactants appear to react in substantially all proportions. It is preferred, however, to carry out the reaction in the following proportions, by weight: equal parts of the alkaline earth metal hydroxide and of the sulfur, and ½ part of the permanently fusible phenol-aldehyde resin. The amount of water in which the reaction is carried out may also vary as desired, but for the preferred proportions of the reactants, it is preferred that about 7½ parts of water be present.

The alkaline earth metal hydroxide which may be used in carrying out the reaction may be lime, slaked or unslaked, or it may be barium hydroxide, magnesium hydroxide or any desired mixture of alkaline earth metal hydroxides. Lime is preferred.

The sulfur may be used in any form in which sulfur is available for reaction with the alkaline earth metal hydroxide and the permanently fusible phenol-aldehyde resin in an aqueous vehicle, but it is preferred that the sulfur be used in its elemental form, either in a pulverized, or sublimated, or colloidal state, preferably the former. The initial form of the sulfur, amorphous, monoclinic or rhombic, is immaterial.

With respect to the permanently fusible phenol-aldehyde resin, that may be any resin of the novolak type, preferably one free or substantially free from free phenol. Where smell is not an objection, the novolak resin may contain some free phenol and an improved product results when this resin is used as a starting material. As is known, novolak resins are linear thermoplastic polymers formed by the acid condensation of a phenol and an aldehyde. The phenol is preferably a monohydric phenol such as phenol or a cresol or xylenol. As for the aldehyde, that may be the true aldehyde such as formaldehyde or a compound which engenders formaldehyde such as paraformaldehyde, hexamethylenetetramine, etc. Mixtures of the various phenols or aldehydes may be used in forming the permanently fusible phenol-aldehyde resin reactant of the present invention.

In carrying out the process for making the complex of the present invention, the reactants are preferably ground or otherwise reduced to a fine particle state, suitably of a size that will pass a Tyler 100 mesh standard screen, and mixed into a homogeneous mass before the addition thereof to the water. The homogeneous mixture is then added to the heated water in a suitable stainless steel or Pyrex vessel and the reaction mass is stirred until the reaction is effected, as indicated by the dissolution of the reactants in the vehicle. The resulting aqueous solution of the complex is stable for indefinite periods of time when protected from contact with carbon dioxide or air, and when exposed to carbon dioxide or air forms an insoluble film.

The property of the aqueous solution of the complex of the invention of forming an insoluble film when exposed to carbon dioxide, carbonic acid or air may be relied on to protect, at least for a time, a batch of the solution which is standing in an open container. The surface portion of the solution exposed to air reacts with the carbon dioxide in the air to form an insoluble film which is incapable of being penetrated by air. This film remains on the top of the solution, unless broken by shaking, for example, and protects the underlying portion of the solution from coming in contact with the air and thus prevents precipitation of the complex from the solution.

If it is desired to produce the complex of the present invention in dry form for use as a dusting powder, carbon dioxide, carbonic acid or other weak acid may be introduced into the solution in any desirable manner, as by bubbling carbon dioxide gas through the solution, for example, whereupon the complex is precipitated in an insoluble form. The precipitate is then removed, dried and pulverized into suitable dusting powder form. This dusting powder has very substantial adhesive properties which enables it to adhere to the plant, wood, fabric or other material to which it is applied. The plants and other materials coated with this dusting powder are resistant to the attack of fungi and insects. The powder was effective for the protection of young pine seedlings from the disease *Lophodermium pinastre*.

The preferred fungicidal and insecticidal compositions of the present invention are aqueous solutions of the complex because these solutions lend themselves for more ready and effective use as liquid sprays than other known sprays. The following examples are illustrative of methods of forming the complex and the preferred compositions of the present invention. It is to be understood that the invention is not limited to the specific conditions, reactants, proportions and details set forth therein since these may be varied as pointed out above. In the examples "parts" indicates parts by weight. Also in the examples, the novolak resin named was one produced in accordance with conventional procedures, from 10 mols of phenol and 9 mols of formaldehyde. The sulfur used was the conventional commercial powdered form.

Example 1

|  | Parts |
|---|---|
| Slaked lime | 39.6 |
| Sulfur | 39.6 |
| Novolak resin | 19.8 |
| Water | 297.0 |

Example 2

|  | Parts |
|---|---|
| Slaked lime | 26.4 |
| Magnesium hydroxide | 13.2 |
| Sulfur | 39.6 |
| Novolak resin | 19.8 |
| Water | 297.0 |

Example 3

|  | Parts |
|---|---|
| Barium hydroxide | 39.6 |
| Sulfur | 39.6 |
| Novolak resin | 19.8 |
| Water | 297.0 |

Each of the foregoing was reacted as follows: the water was brought to a boil in a steel vessel and the reactants in finely ground powder form and in homogeneous admixture were stirred into the boiling water. Stirring and heating were continued until the reactants were dissolved. The resulting solutions were permitted to cool to room temperature. Each solution was free flowing and adhesive and had the property of wetting and spreading over a surface, such as a plant leaf, to which it was applied, as by a spray. The coatings dried rapidly and the resulting films were strongly adherent and of great durability. The films were flexible and did not break upon flexing of the plant leaves to which applied, and remained intact on the leaves even when it was continuously sprayed with a strong stream of water and exposed to strong winds.

Plants and plant seedlings coated with a water-insoluble film deposited from a sprayed aqueous solution of the complex of my invention maintained their moisture content better than non-treated ones. Young pine seedlings so coated were much better able to bear transplantation and were also immune to the disease *Lophodermium pinastre* whereas untreated controls were not. The treated specimens were resistant to fungus attack whereas the control specimens were not. Additionally, the plants showed no signs of having been corroded or otherwise deleteriously affected by being in contact with the protective film of the alkaline earth metal hydroxide-sulfur-phenol-aldehyde resin complex. Apparently any alkaline corrosiveness flowing from the use of the alkaline earth metal hydroxide is lost as a result of its interaction with the sulfur and the novolak resin.

Oranges, grapes and other fruits sprayed with an aqueous solution of the complex of my invention were protected during transit from mold growth and from loss of moisture. Wood, leather, organic fibers and fabric made therefrom when coated with any aqueous solution of my complex were resistant to fungus attack.

When the leaves of trees and shrubs were sprayed with an aqueous solution of my complex the sprayed leaves were free from insect attack whereas adjacent untreated leaves were not. The films on the sprayed leaves were not washed therefrom by rain and remained intact upon prolonged exposure to sun and wind.

Although the complex of the present invention has a pH on the alkaline side about 11, spraying apparatus in which solutions of the complex have been used over long periods of time show little if any pitting or other forms of corrosion.

Metal surfaces having thereon a film of my complex in water-insoluble form are resistant to oxidation and the corrosive action of weak acids and alkalis.

A solution of the complex of the present invention may be used as a vehicle for desired mycocidic, insecticidic and like agents which are ordinarily insoluble in water, such as carbon disulfide, zinc and iron thiocarbamate, etc., since these agents are soluble to more or less of an extent in the solution; in some cases completely soluble in the solution.

I claim:

1. The method of forming a composition of matter comprising mixing in an aqueous vehicle an alkaline earth metal hydroxide, sulfur and a permanently fusible phenol-aldehyde resin formed by condensing an aldehyde of the class consisting of formaldehyde and compounds which engender formaldehyde with a phenol of the class consisting of phenol, cresol and xylenol, until a product soluble in the vehicle is formed, contacting the said solution with a compound of the class consisting of carbon dioxide and compounds containing the same to precipitate from the solution an insoluble product, and separating the insoluble product from the solution.

2. The method of forming a composition of matter comprising mixing in an aqueous vehicle an alkaline earth metal hydroxide, sulfur and a permanently fusible phenol-aldehyde resin formed by condensing an aldehyde of the class consisting of formaldehyde and compounds which engender formaldehyde with a phenol of the class consisting of phenol, cresol and xylenol, until a product soluble in the vehicle is formed, contacting the said solution with a compound of the class consisting of carbon dioxide and compounds containing the same to precipitate from the solution an insoluble product, separating the insoluble product from the solution, and drying the insoluble product.

3. The method of forming a composition of matter comprising mixing an alkaline earth metal hydroxide, sulfur, and a permanently fusible, phenol-aldehyde resin formed by condensing an aldehyde of the class consisting of formaldehyde and compounds which engender formaldehyde with a phenol of the class consisting of phenol, cresol and xylenol, in an aqueous vehicle until a product soluble in the vehicle is obtained.

4. The method of forming a composition of matter comprising mixing slaked lime, sulfur, and a permanently fusible, phenol-aldehyde resin formed by condensing an aldehyde of the class consisting of formaldehyde and compounds which engender formaldehyde with a phenol of the class consisting of phenol, cresol and xylenol, in an aqueous vehicle until a product soluble in the vehicle is obtained.

5. The product formed by the method of claim 3.

6. The product formed by the method of claim 4.

7. The product formed by the method of claim 1.

8. The product formed by the method of claim 2.

References Cited in the file of this patent

UNITED STATES PATENTS

| Number | Name | Date |
| --- | --- | --- |
| 1,038,387 | Kibler | Sept. 10, 1912 |
| 1,186,564 | Fest | June 13, 1916 |
| 2,112,412 | Wetchler | Mar. 29, 1938 |